US008233485B2

(12) United States Patent
Hersent

(10) Patent No.: US 8,233,485 B2
(45) Date of Patent: Jul. 31, 2012

(54) NETWORK INTEROPERABILITY

(75) Inventor: Olivier Hersent, Paris (FR)

(73) Assignee: Comverse Ltd, Tel Aviv (IL)

( * ) Notice: Subject to any disclaimer, the term of this patent is extended or adjusted under 35 U.S.C. 154(b) by 1383 days.

(21) Appl. No.: 11/892,033

(22) Filed: Aug. 17, 2007

(65) Prior Publication Data
US 2008/0056242 A1 Mar. 6, 2008

(30) Foreign Application Priority Data

Aug. 17, 2006 (EP) .................................... 06291323

(51) Int. Cl.
H04L 12/66 (2006.01)
H04L 12/56 (2006.01)
H04M 7/00 (2006.01)

(52) U.S. Cl. ..................... 370/395.2; 370/352; 370/353; 370/354; 370/356; 370/389; 370/392; 379/221.08; 379/221.09; 379/221.11; 379/221.12

(58) Field of Classification Search .................. 370/235, 370/395.52, 431, 352–356, 389, 392, 395.2; 455/461, 428, 433, 435.1–435.2; 379/220.01–221.12
See application file for complete search history.

(56) References Cited

U.S. PATENT DOCUMENTS

| | | | |
|---|---|---|---|
| 7,551,725 B2 * | 6/2009 | Kafka | 379/32.01 |
| 8,036,211 B1 * | 10/2011 | Leeder et al. | 370/353 |
| 2002/0059416 A1 | 5/2002 | Tuunanen | 709/223 |
| 2005/0002381 A1 * | 1/2005 | Westman et al. | 370/352 |
| 2005/0027867 A1 * | 2/2005 | Mueller et al. | 709/227 |
| 2005/0254425 A1 * | 11/2005 | Suumaki et al. | 370/235 |
| 2006/0019667 A1 * | 1/2006 | Hicks, III | 455/445 |
| 2006/0023657 A1 * | 2/2006 | Woodson et al. | 370/328 |
| 2006/0105766 A1 | 5/2006 | Azada et al. | |
| 2006/0280169 A1 * | 12/2006 | Mahdi | 370/352 |
| 2007/0133782 A1 * | 6/2007 | Zhu | 379/265.09 |
| 2007/0173226 A1 * | 7/2007 | Cai et al. | 455/405 |
| 2007/0253547 A1 * | 11/2007 | Sanchez et al. | 379/221.09 |
| 2008/0247384 A1 * | 10/2008 | Arauz-Rosado et al. | 370/352 |
| 2009/0022147 A1 * | 1/2009 | Farris et al. | 370/352 |

FOREIGN PATENT DOCUMENTS

WO WO 2006/077587 7/2006

OTHER PUBLICATIONS

Joseph, et al. "Converged Wireline-Wireless Network Evolution: Opportunities and Challenges", Bell Labs Technical Journal, vol. 10, No. 2, p. 57-80, 2005. XP002415850. *p. 68, right-hand column, line 8 and p. 69, right-hand column, line 11*.

* cited by examiner

Primary Examiner — Asad M Nawaz
Assistant Examiner — Wutchung Chu
(74) Attorney, Agent, or Firm — Ohlandt, Greeley, Ruggiero & Perle, L.L.P.

(57) ABSTRACT

The present invention relates to a method in a communication network for connecting at least one application server (AS) (213) of an internet protocol multimedia subsystem (IMS) (200) to an intelligent network (IN) (100) through an interface unit (301). The IMS (200) comprises a call server control function (CSCF) unit (205) connected to the at least one AS (213) arranged for processing call signaling. In the method the interface unit (301) directs the call signaling to the at least one AS (213) through the CSCF unit (205) and the at least one AS (213) processes the call signaling and sends the processed call signaling through the CSCF unit (205) back to the interface unit (301). Based on the information received in the call signaling processed by the at least one AS (213), the interface unit (301) then directs the call to a destination.

10 Claims, 3 Drawing Sheets

NETWORK INTEROPERABILITY

This application claims priority from the European patent application EP06291323 filed on 17 Aug. 2006, which is hereby incorporated by reference in its entirety.

FIELD OF THE INVENTION

The present invention relates to interoperability between communication networks. More specifically, it relates to a situation in which application servers of an internet protocol multimedia subsystem (IMS) provide services to terminals of a time division multiplexing (TDM) intelligent network (IN).

BACKGROUND OF THE INVENTION

Network service providers are facing a major migration challenge, as the telephony networks currently deployed using TDM digital switches need to be redesigned to use voice over internet protocol (VoIP). Emerging standards such as the European Telecommunication Standards Institute (ETSI) $3^{rd}$ Generation Partnership (3GPP) IMS also change the way network services may be designed.

In conventional telephone networks employing TDM, a major issue faced by complex telecom services is the so-called "tromboning", which means that a switch which implements a specific service and which is used to set up a call also processes the voice bearer channels when the call has already been set up.

In a large network, a call from a user located in a city A to another user also in the city A may need to be processed by a centralized switch located in a city B. If the distance between these two cities is large, then the voice path is long enough to introduce perceptible delays, echoes, and require additional and expensive echo cancellers.

The widely used signaling system #7 (SS7) does not solve the problem even if the transport networks are separate for signaling and voice bearers. In fact, although the transport network of the signaling and voice are indeed separate, the SS7 integrated services digital network user part (ISUP) signaling and voice bearers are still processed by each switch. It is not feasible to build centralized service switches processing only SS7 ISUP without also implementing a TDM switching matrix for the voice bearers. Therefore, TDM centralized service switches continue to cause tromboning issues even in TDM networks using SS7 signaling.

The technology called intelligent network (IN) can be used in order to partially solve this problem. This technology uses an abstract call model, and lets an external application interact with a remote TDM switch using control primitives acting on the abstract call model. The intelligent network application part (INAP) protocol standardized by the International Telecommunications Union (ITU) (ITU-T SG 11, recommendation Q1224 approved in 1997) is the most widely used protocol enabling an external application to interact with remote TDM switches using a call processing logic that can be modeled according to the state machine defined by ITU Q1224. The ITU has also defined IN capability set (CS) call models (ITU-T SG 11 Q1244 defines CS4), which let INAP applications control voice over IP (VoIP) calls.

FIG. 1 represents a simplified block diagram of a prior art TDM IN 100 solution. In FIG. 1 there are two telephones 101 that are connected to each other via a service switching point (SSP) 103 also known as a service switching function (SSF). The SSP 103 is further connected to a service control point (SCP) 105 also known as a service control function (SCF). In FIG. 1 the phones 101 are physically located in cities A and C, whereas the SSP 103 is located in the city B. Even if the phones 101 were located in the same city, for instance in the city A, all calls, i.e. signaling and media, would have to be processed through the city B where the SSP 103 is located. The distance between A, B and C can be hundreds or even thousands of kilometers creating a potential tromboning problem, and possibly inducing echo. For this reason the SSP 103 is often collocated with local telephone exchanges requiring many points of presence for such SSP function and inducing substantial costs.

The SSP 103 acts as a trigger point for further services to be invoked during a call. The SSP 103 may invoke a query to the SCP 105 to wait for instructions on how to proceed. The SCP 105 contains service logic which implements the behavior described by the operator. This enables service providers to deploy the application logic centrally, while only SSPs are distributed. The signaling protocol used between the SSP 103 and the SCP 105 is INAP and is based on an abstract call model which represents the capabilities of the SSP 103.

The SSP and SCP functions can also be collocated, leading to the so-called "service node" deployment model. In this case there is no longer a requirement for standardized call model. However, this induces even higher costs as the SSP function needs to be distributed because of tromboning issues and therefore, in this case also the application needs to be deployed over multiple Points of Presence (POPs).

By contrast to TDM technology, VoIP technology separates the media transport plane and the call & media control plane. A VoIP service switch can interact with media streams without processing the IP packets containing the signaling at all.

For instance, in FIG. 1, if the phones 101 are communicating with each other by use of VoIP, then the calls are set up via the SSP 103 but once the calls are set up, the IP packets transporting the media stream can be routed to the destination directly without a need to route the packets via the SSP 103 any longer. The tromboning problem no longer exists in a properly designed VoIP network. Because there is no tromboning, the SSP function can now be centralized and because it can be centralized it can also be collocated with the application logic itself (SCP). With both SSP and SCP collocated, there is no longer a need for a standardized call model supporting communication between them.

Recognizing this major improvement, the ETSI $3^{rd}$ Generation Partnership Project (3GPP) defined internet protocol multimedia subsystem (IMS) which is a new telecommunications service architecture optimized for VoIP technology.

FIG. 2 shows a simplified block diagram of an IMS network 200. An IP network 201 is connected to a call session control function (CSCF) block 203. The CSCF block 203 further comprises serving CSCF (S-CSCF) 205, interrogating CSCF (I-CSCF) 207 and proxy CSCF (P-CSCF) 209. The CSCF block 203 is connected to application servers (ASs) 213. The IMS calls are processed by one or several ASs under control of the S-CSCF 205.

The CSCF block 203 is further connected to home subscriber server (HSS) 211. It contains the subscriber-related information, performs authentication and authorization of the user, and can provide information of the physical location of the user. The CSCF block 203 is further connected to a media resource function (MRF) 215 and a gateway 217, which interfaces with a circuit switched public switched telephone network (PSTN) or public land mobile network (PLMN) 219. The MRF 215 provides a source of media in the home network and it is, for instance used for playing announcements, real-time transcoding of multimedia data, text-to-speech conversation and speech recognition.

The use of VoIP by the IMS network 200 has an important consequence. While TDM networks required a standardized call model in order to allow applications to efficiently interact with the communications network, the ASs 213 have access to the call signaling directly, and therefore no call model is required. This gives much more flexibility to application designers, reduces the complexity of the network, mainly by reducing the level of interactions between components, and makes it possible to introduce applications not previously allowed by the call models standardized for TDM networks.

For instance the IMS network 200 allows support for applications in a roaming environment for cellular phones. In TDM INs 100 most services, e.g. a short numbering plan for a corporation, are lost when roaming outside of the home network, because routing outgoing calls to the home network would create a tromboning problem, and because INAP links are not so frequently allowed among roaming networks. In an IMS network 200, on the contrary, the signaling of all calls placed by an end user in a roaming situation is routed to the home network, and therefore most services working in the home environment will work in a roaming situation.

Many service providers are now convinced that the advantages brought by VoIP and the IMS architecture justify a migration of TDM networks to VoIP and IMS. However, such a migration takes a long time, and for a long time TDM networks such as mobile GSM networks and IMS networks 200 will have to coexist. It is tempting for TDM service providers to start developing all new applications in an IMS mode, using IMS ASs 213, and stop developing IN applications in current TDM networks. However, most IMS devices will have to work in dual mode initially, and therefore the same application logic needs to be available while working in IMS mode or working in TDM mode.

Developing applications for the two networks would require to either develop them twice, as IMS AS applications and as IN applications, or would require introducing an IMS AS implementing an IN call model and develop the application in IN mode only.

The latter approach, using an IN call model for VoIP networks, has been proposed by multiple standard bodies and resulted in concepts and products such as IN CS4, JAIN or PARLAY. Although this approach does have the merit of allowing a single application to run over a TDM or a VoIP network, it does have significant drawbacks.

It proposes to continue using the standardized call model of the IN 100, and therefore has some limitations. All applications cannot be developed using the IN call models. It introduces a complexity not required by most native IMS applications that could be implemented directly over an IMS AS 213, and perhaps using other call models or application programming interfaces (APIs) more suited to the application. It does not enable building applications controlling both TDM and IP legs in a transparent manner: applications need to control separately TDM to TDM calls, and IP to IP calls. TDM to IP calls need to be processed twice: once by the TDM to TDM application logic which is responsible to route the call to a VoIP gateway, then by the VoIP to VoIP application logic. The VoIP to TDM bridge logic has to be designed by each application developer.

SUMMARY OF THE INVENTION

One object of the invention is to limit the above identified deficiencies. More specifically, a method for connecting the IMS network 200 to the IN 100 by use of ASs 213 has been invented.

According to a first aspect of the invention there is proposed a method for connecting at least one AS of an IMS network to an IN through an interface unit, wherein the IMS comprises a CSCF unit connected to the at least one AS arranged for processing call signaling, wherein the method comprises the following steps with respect to a call:
  the interface unit directing call signaling to the at least one AS through the CSCF unit;
  the at least one AS processing the call signaling and sending the processed call signaling through the CSCF unit back to the interface unit; and
  based on the information received in the call signaling processed by the at least one AS, the interface unit directing the incoming call to a destination.

The invention in accordance with an embodiment of the invention has the advantage that it allows a smooth integration of the IN 100 and the IMS network 200. The invention thus makes it possible to the IMS ASs 213 to control the IN 100 endpoints. Furthermore, there is no need to design the applications separately to the INs 100 and to the IMS networks 200, nor is there a need to implement the IN call model in IMS ASs 213 and develop the applications in IN mode only.

The invention further allows, in accordance with an embodiment, to program telecommunication applications using only the SIP/IMS service control (ISC) interface. The interface can take control of heterogeneous IMS and TDM/IN endpoints, and the applications do not need to handle any special case for the TDM to IP or IP to TDM calls.

The invention also relates to a corresponding system, an interface unit and a computer program product.

BRIEF DESCRIPTION OF THE DRAWINGS

Other features and advantages of the invention will become apparent from the following description of non-limiting exemplary embodiments, with reference to the appended drawings, in which.

DETAILED DESCRIPTION OF THE INVENTION

Next some embodiments of the invention will be described in more detail with reference to FIGS. 3 and 4. In the following description the originating side is the side and corresponding network elements from where the call originates as opposed to terminating side which is the side and corresponding network elements where the call terminates. Furthermore, in the following description, the TDM IN 100 operates in accordance with global system for mobile communications customized applications for mobile network enhanced logic (GSM CAMEL) standard, but the IN 100 could equally use any other TDM communication standard.

Figure 1:
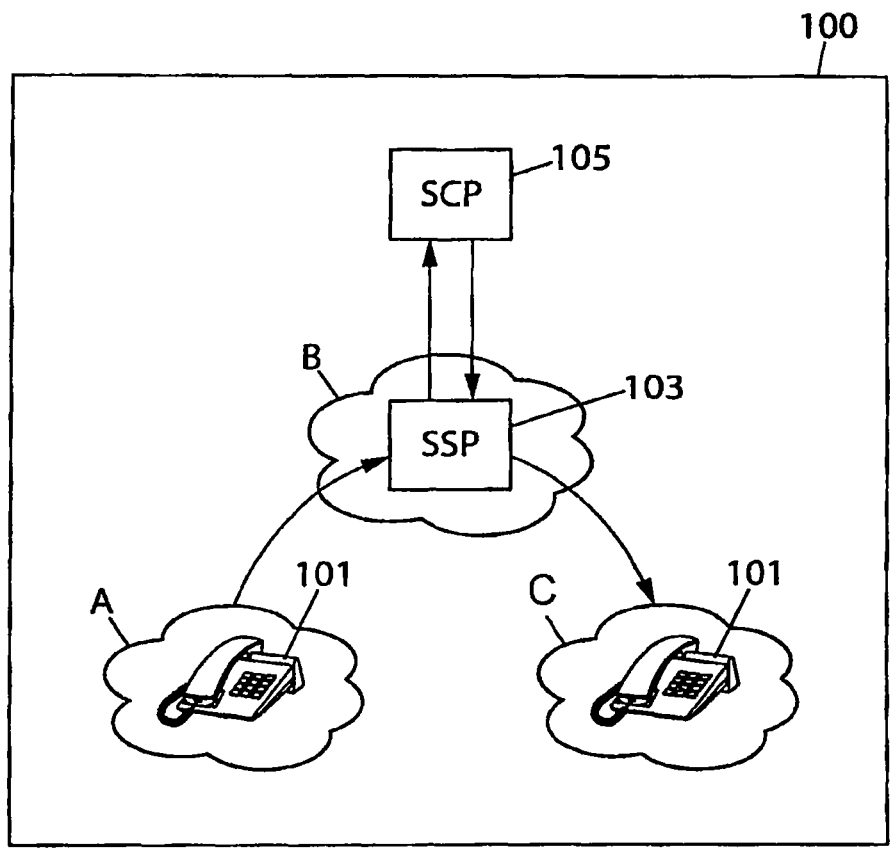
FIG. 1 is a simplified block diagram of a prior art TDM intelligent network 100.
Figure 3:
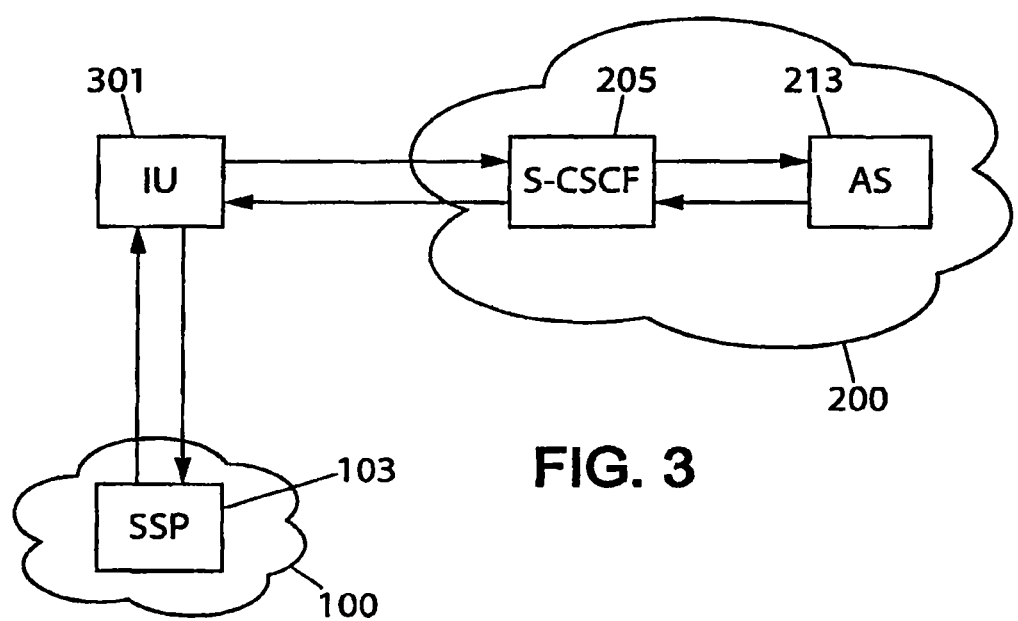
FIG. 3 is a simplified block diagram of an architecture for integrating the IN 100 and the IMS network 200 in accordance with an embodiment of the present invention.
Figure 2:
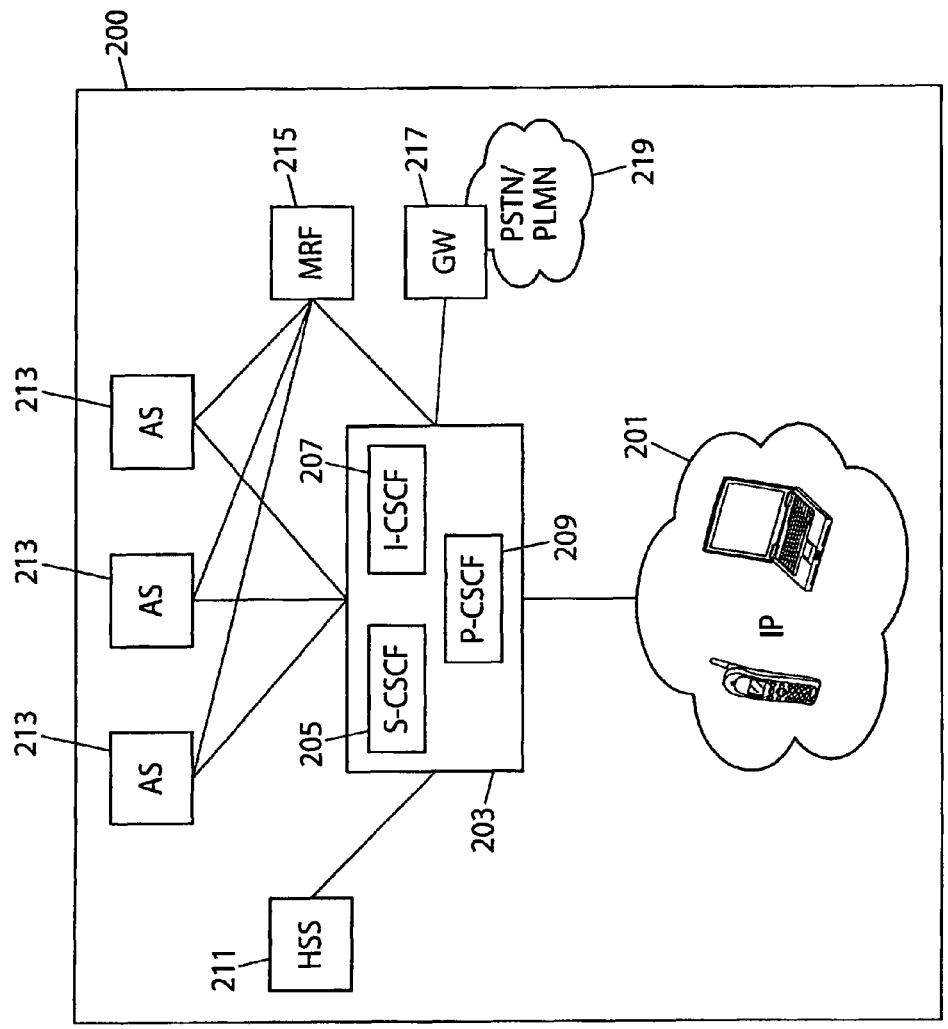
FIG. 2 is a simplified block diagram of a prior art IMS network 200.
Figure 4:
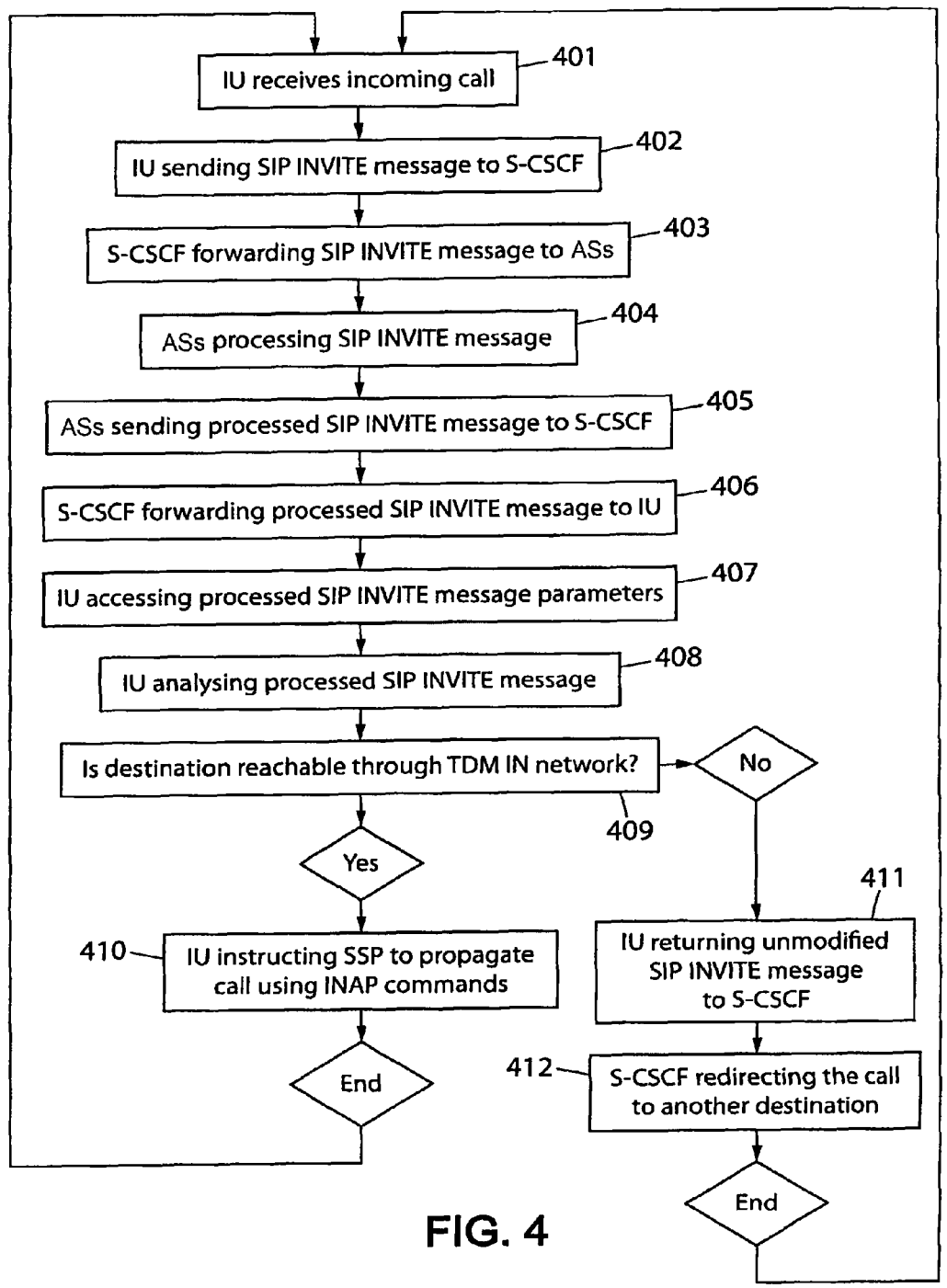
FIG. 4 is a flow chart depicting a method for integrating the IN 100 and the IMS network 200 in accordance with an embodiment of the invention.

FIG. 3 represents how the IN 100 shown in FIG. 1 and the IMS network of FIG. 2 can be connected to each other via an interface unit (IU) 301. The session initialization protocol (SIP) used by IMS ASs 213 has been extended by the ETSI 3GPP in order to introduce facilities not present in the original Internet Engineering Task Force (IETF) SIP protocol, in particular to facilitate the chaining of applications and the control of application sequencing by the S-CSCF 205. The S-CSCF 205 and the AS 213 are thus equipped with IMS service control (ISC) interfaces to communicate with each other and to provide the extended SIP facilities.

The IU 301 uses a first access protocol, in this example ISC/SIP to communicate with the S-CSCF 205 and a second access protocol, in this case INAP protocol, to communicate with the IN 100.

The IU 301 of FIG. 3 is interfacing with an external S-CSCF 205. However, it is also possible to embed a dedicated S-CSCF function into the IU 301. In the latter case the IU 301 behaves like a standard IMS S-CSCF 205.

The S-CSCF 205 is responsible for sending the IMS call over the ISC interface to each of the relevant ASs 213. ASs 213 are instructed by the S-CSCF 205 to return the call signaling, after appropriate processing, to the S-CSCF 205, which can then send the call signaling to the next AS 213. This property is used to enable access to many applications designed on top of an IMS AS 213 from a TDM IN 100. This is achieved by emulating IMS entities on top of an IN SCP 105.

The IU 301 when invoked by the IN 100 is arranged to give instructions regarding the processing of a call, to simulate a 3GPP SIP call to the target AS(s) 213 relayed by a P-CSCF 209 if the call is from a TDM terminal or I-CSCF 207 if the call is directed to a TDM terminal.

The calls of subscribers get specific processing depending on whether the call originates from the IN 100 or from the IMS network 200.

For sessions originating from the IN 100, the call control is directed to the IU 301 which further relays the call to the S-CSCF 205. The call will get back to the S-CSCF 205 after processing by each AS 213, and the S-CSCF 205 routes this call to the IU 301 as last originating side AS 213. This enables the IU 301 to analyze the modifications affecting the call signaling after processing by the ASs 213, and convert these modifications as appropriate for the IN call model, if possible and necessary.

For incoming calls from the IMS network 200, the call will reach the IU 301, because the IU 301 registers the SIP address of record (AoR, the public identity of the endpoint) of the endpoints it controls onto the S-CSCF 205.

The IU 301 sends TDM calls received on the terminating side, i.e. to the GSM user, to the IMS network 200. This is achieved by the IU 301 emulating the I-CSCF 207 sending a call from another network or S-CSCF 205 to the S-CSCF 205 of the target user.

Many IMS applications can be converted in an optimal way to proper INAP primitives. For instance, an IMS service implementing a short numbering plan for an enterprise modifies only calling and called numbers, or generates announcements. The IU 301 can detect whether a call is GSM to GSM and in this case sends the customized applications for mobile network enhanced logic (CAMEL), an IN protocol with extensions for GSM networks, instruction to the GSM mobile switching centre (MSC), a TDM switch with an IN call model, to route the call after modification of the calling or called parties.

In a GSM network, a user of an application using the IU 301 will need to have a CAMEL trigger defined for all relevant incoming (DP12) and outgoing (DP2) calls. This is defined in the GSM home location register (HLR) as part of the profile of that user. In other TDM INs 100 the IN switches also need to be configured to send an INAP initial detection point to the IU 301 for any outgoing or incoming call. The way to configure this depends on the TDM network vendor, but usually involves a "service mark", e.g. specific configuration information in the access TDM switch, linked to the physical access link to the user.

If the call is GSM to VoIP, e.g. to an IP phone, then the IU 301 may decide to execute the application logic in the IN network, or later when the call is processed by the VoIP network. If the AS 213 application logic generates an announcement, then the IU 301 instructs the MSC to connect the call to the VoIP announcement server through a VoIP gateway.

The IU 301 is not invoked for VoIP to VoIP calls, as the application logic used will be that of the IMS AS 213, and does not require any adaptation.

For eliminating tromboning, the IU 301 identifies TDM to TDM calls, and emulates the IMS AS application logic using INAP commands to the TDM IN switches of the calling and called party users.

The IU 301 needs to be made aware of any outgoing or incoming calls from terminals having the phone numbers that must be controlled by the IMS network 200. This is achieved by registering the IU 301 logic as INAP trigger detection point (TDP-R).

Calls are routed through a voice over internet gateway over the IMS 200 at least in one of the following situations: TDM to IP calls, IP to TDM calls or when call handling capabilities of the AS exceed the capabilities of a SSP 103 of the IN 100. The call routing is done by the IN 100 instructing an SSP 103 of the IN 100 to route the call through a voice over internet gateway over the IMS 200.

Next an exemplary embodiment of the invention is described with reference to the flow chart of FIG. 4. In this embodiment of the invention, the destination is reachable through the TDM IN 100 and the call is received from the IN 100, which operates in accordance with a GSM standard.

At step 401 the IU 301 receives an Initial DP service request, i.e. an incoming call from the originating IN SSP 103 of an incoming call from the IN 100. Then at step 402 by emulating the operation of the P-CSCF 209, or access gateway control function (AGCF) in the TISPAN IMS variant, the IU 301 sends a SIP INVITE message to the S-CSCF 205 of this user (possibly through an I-CSCF 207 if the service provider has so configured its IMS network 200). The S-CSCF 205 then executes the service triggers defined for this user, by propagating (step 403) the SIP INVITE message to a sequence of originating ASs 213 which may relay and modify (step 404) any parameter of the SIP INVITE message, or even absorb it.

Next at step 405 the last AS 213 sends the processed SIP INVITE message to the S-CSCF 205 and S-CSCF 205 forwards (step 406) the processed SIP INVITE message to the IU 301. This is achieved by defining the IU 301 as the last originating AS 213 for this user's identity in the user HSS 211 profile, in this case originating and terminating sides are handled separately, but it is also possible to wait until the SIP call returns to the terminating side IU 301, in which case the IU 301 will execute in one step both originating and terminating services. This is called here as a variation "SIMPLE".

Next at step 407 the IU 301 accesses the processed SIP INVITE message parameters as modified by the sequence of originating ASs 213 invoked by the S-CSCF 205. The originating side IU 301, when it receives the SIP INVITE message processed by the sequence of originating side ASs 213, analyses (step 408) the new destination number or uniform resource identifier (URI) as modified by the ASs 213. For instance, the ASs 213 may have expanded a short number, e.g. 1234, into a public format, such as +33 671201234.

If the IU 301 determines (step 409) that the destination number, at this stage, is reachable in TDM mode by the SSP 103, it instructs the SSP 103 to propagate (step 410) the call over TDM IN 100 using the appropriate CAMEL commands. The reachability may be determined by multiple means, e.g. by using number pattern analysis, i.e. number belongs to a number block which is part of the IN 100, local number portability query, carrier for this number corresponds to the IN 100, or HLR query for GSM networks. Several of these reachability determination methods can be used simultaneously.

The destination user may have set its profile to redirect the call to another destination. If the new destination is TDM or if the call has not been redirected, then the call flow is optimized, end-to-end, over TDM. However, if the new destination is IP, then a VoIP gateway will be invoked on the terminating side. This can be achieved by instructing the IN SSP to route the call to a VoIP gateway acting as an Intelligent Peripheral. The MRF 215 could act for this purpose as the VoIP gateway. This method effectively gives precedence to the TDM path over the IP path by the originating IU 301.

If the destination is an endpoint also controlled by the IMS service logic, its IU 301 will be invoked by a CAMEL Initial DP command from the SSP 103 (running on the originating side in the CAMEL model). The IU 301 managing the destination endpoint sends a SIP INVITE message to the terminating side S-CSCF 205 of the corresponding user identity, and the terminating side S-CSCF 205 invokes the terminating side ASs 213 as configured in the HSS profile of this user's identity.

The terminating side IU 301 then receives an SIP INVITE message processed by the sequence of terminating side ASs 213, because the IU 301 registered the corresponding address of record. In the "SIMPLE" variation, the terminating IU 301 communicates modified call parameters to the originating IU 301 at this stage, triggering the routing process described earlier. The terminating side IU 301 instructs the SSP 103 to connect the call if the modified destination is reachable by this SSP 103.

Any of the originating side ASs 213 may terminate the call locally, e.g. to an announcement specifying that the call has been blocked. In this case the IU 301 does not receive the SIP INVITE message of step 406. Instead, the originating side IU 301 receives a session description protocol (SDP) answer, and connects the GSM terminal to the announcement through a VoIP gateway. It is also possible that any of the terminating side ASs 213 terminates the call locally, e.g. to an announcement specifying that the call has been blocked.

If the originating side IU 301 determines at step 409 that the destination number, at this level, is not reachable in TDM mode by the SSP 103, it acts as a non-concerned AS 213 by returning (step 411) the SIP INVITE message to the S-CSCF 205 unmodified with an SIP contact header allowing the S-CSCF 205 to by-pass this AS 213 for any subsequent message.

The terminating side S-CSCF 205 then redirects (step 412) the call to another destination. If the destination is in IP network, as is the case for a normal call not redirected by the destination, then the TDM to IP call flow is optimized, and the VoIP gateway used is that controlled by the originating IU 301 and the MRF 215 acts as a VoIP gateway.

However, if the destination redirects the call to a TDM destination, the TDM shortcut will be established by the originating side IU 301 if it runs on the same IU 301 as the terminating side IU 301.

An incoming call to an IN 100 controlled endpoint may be coming from 3 types of callers:

A caller using an endpoint managed by the IN 100. This case has been explained above.

A caller using an endpoint controlled by the IMS network. In this case, the terminating side services of the called endpoint are executed in the IMS network 200 before reaching the IU 301. In this case the IU 301 simply routes the call to a gateway MSC of a GSM network, and recognizing this, the gateway MSC simply instructs the SSP 103 to continue normal call handling, thus terminating the INAP control relationship.

A caller using an endpoint managed by a third party network. In this case the call arrives at a regular gateway MSC, and an INAP initial DP is triggered to the IU 301. Terminating side services have not yet been performed, and the IU 301 needs to emulate an incoming call to the IMS network 200. The IU 301 then sends an SIP INVITE message to the S-CSCF 205 as described above and rest of the call processing procedure goes according to steps 406-412.

The procedures described above need to be simplified if IN 100 supports only CS-1 or CAMEL. The CAMEL protocol has major limitations (no half-leg call model) which do not allow conversion from AS 213 commands to IN 100 commands in the general sense.

However, mapping to IN 100 can be performed provided that the application logic complies with the following limitations:

if a first media port presented to the caller is a TDM port, i.e. SDP information corresponding to an IN controlled endpoint, then the ISC application server does not initiate a new SDP offer for the rest of this dialogue, the initial offer/answer SDP exchange is final.

it is acceptable for the application, if the first media port presented to the caller is an IP port, that any subsequent SDP offer with a TDM port will not be optimized, i.e. the media path between the TDM user devices will be routed via the IMS. Tromboning will occur through IP for the rest of the dialog, even though at some moments during the dialog, the source and destination of media streams are both in the TDM network.

These limitations still allow implementation of sophisticated services. For instance, the following applications are possible: number conversion, e.g. short numbering plans, call filtering, accounting, call forwarding, anonymous call blocking, computer telephony interface (CTI) call supervision. These are examples of call services which do not require a dynamic update of media streams, i.e. not more than one SDP offer-answer is required. If an AS 213 needs to provide a service to a mobile end-user which requires dynamic update of media streams, then the first media termination port provided to the caller needs to be an IP port.

The invention also relates to the corresponding computer program product that is capable of implementing the method in accordance with the embodiments of the invention when loaded and run on computer means of the network.

Furthermore, the invention relates to a corresponding system that comprises at least the IU 301 that is arranged to perform any of the method steps in accordance with the embodiments of the invention. The system may further comprise at least some elements of the IN 100 and the IMS network 200.

Above the invention was described by use of some exemplary embodiments. However, it is to be noted that the invention is not limited to those examples, but the scope of the invention can vary within the appended claims.

The invention claimed is:

1. A method in a communication network for connecting an application server (AS) of an internet protocol multimedia subsystem (IMS) to an intelligent network (IN) through an interface unit, wherein the IMS comprises a call server control function (CSCF) unit connected to the AS arranged for processing call signaling, wherein the method comprises the following steps with respect to a call:
   the interface unit directing call signaling to the AS through the CSCF unit;
   the AS processing the call signaling, thus yielding processed call signaling, and sending the processed call signaling through the CSCF unit back to the interface unit;
   the interface unit (a) receiving the processed call signaling, and (b) directing the call to a destination based on information received in the processed call signaling, by instructing a service switching point of the IN to route the call over the IN in a case where the call is an intelligent network to intelligent network call; and
   the interface unit returning the processed call signaling unmodified to the CSCF unit in a case where the call is destined to the IMS.

2. The method according to claim 1, wherein the method further comprises the interface unit communicating with the AS by use of a first access protocol and the interface unit communicating with the IN by use of a second access protocol, the first access protocol being different from the second access protocol.

3. The method according to claim 1, wherein the call signaling is associated with a phone number and the method further comprises the AS modifying the phone number.

4. The method according to claim 1, wherein the call originates from/terminates to an endpoint identified by a public identifier and the method further comprises the interface unit registering the public identifier of the endpoint onto the CSCF unit.

5. The method according to claim 1, wherein the destination is a device selected from the group consisting of an intelligent network unit, a voice over internet protocol gateway, and an announcement server.

6. The method according to claim 1, wherein directing the call to a destination comprises the interface unit instructing the service switching point to route the call through a voice over internet gateway over the IMS in a case selected from the group consisting of (a) where the call is an intelligent network to internet protocol call, (b) where the call is an internet protocol to intelligent network call, and (c) when call handling capabilities of the AS exceed call handling capabilities of the service switching point.

7. The method according to claim 1, wherein the interface unit acts as a last originating side application server.

8. A non-transitory computer-readable medium encoded with a program product that, when loaded and run on a computer, implements the method according to anyone of claims 1-4, 5, 6 or 7.

9. An interface unit arranged for connecting an application server (AS) of an internet protocol multimedia subsystem (IMS) to an intelligent network (IN), wherein the IMS comprises a call server control function (CSCF) unit connected to the AS arranged for processing call signaling, wherein the interface unit comprises:
   a computer; and
   a computer-readable medium encoded with a program product that, when loaded and run on the computer implements actions of:
      directing signaling pertaining to a call to the AS through the CSCF unit;
      receiving processed call signaling from the AS;
      directing the call to a destination based on information received in the processed call signaling, by instructing a service switching point of the IN to route the call over the IN in a case where the call is an intelligent network to intelligent network call; and
      returning the processed call signaling unmodified to the CSCF unit in a case where the call is destined to the IMS.

10. A method performed by an interface unit arranged for connecting an application server (AS) of an internet protocol multimedia subsystem (IMS) to an intelligent network (IN), wherein the IMS includes a call server control function (CSCF) unit connected to the AS arranged for processing call signaling, the method comprising:
   directing signaling pertaining to a call to the AS through the CSCF unit;
   receiving processed call signaling from the AS;
   directing the call to a destination based on information received in the processed call signaling, by instructing a service switching point of the IN to route the call over the IN in a case where the call is an intelligent network to intelligent network call; and
   returning the processed call signaling unmodified to the CSCF unit in a case where the call is destined to the IMS.

* * * * *